US006851698B2

(12) United States Patent
Ingles

(10) Patent No.: US 6,851,698 B2
(45) Date of Patent: Feb. 8, 2005

(54) COUPLING DEVICE

(75) Inventor: David Ingles, Bingley (GB)

(73) Assignee: Bradley Doublelock Limited, West Yorkshire (GB)

( * ) Notice: Subject to any disclaimer, the term of this patent is extended or adjusted under 35 U.S.C. 154(b) by 0 days.

(21) Appl. No.: 10/458,962

(22) Filed: Jun. 11, 2003

(65) Prior Publication Data

US 2004/0036256 A1 Feb. 26, 2004

(30) Foreign Application Priority Data

Jun. 12, 2002 (GB) .............................................. 0213441

(51) Int. Cl.⁷ ................................................ B60D 1/04
(52) U.S. Cl. ..................................... 280/509; 280/504
(58) Field of Search ................................ 280/400, 477, 280/495, 504, 507–509

(56) References Cited

U.S. PATENT DOCUMENTS

| 752,300 | A | * | 2/1904 | Randolph, Jr. | .............. | 280/509 |
| 788,692 | A | * | 5/1905 | Amman | ...................... | 280/509 |
| 1,437,836 | A | * | 12/1922 | Ferris | ......................... | 280/509 |
| 2,597,096 | A | | 5/1952 | Harris | | |
| 4,232,794 | A | | 11/1980 | Plaster | | |
| 4,958,848 | A | | 9/1990 | Nash | | |
| 5,031,927 | A | | 7/1991 | Frenette | | |
| 5,713,691 | A | | 2/1998 | Solberg | | |

FOREIGN PATENT DOCUMENTS

| DE | 10 08 123 B | 5/1957 |
| DE | 10 29 240 B | 4/1958 |
| DE | 10 30 193 B | 5/1958 |
| DE | 12 08 199 B | 12/1965 |
| EP | 0 968 852 A1 | 1/2000 |

* cited by examiner

Primary Examiner—Lesley D. Morris
Assistant Examiner—Matthew Luby
(74) Attorney, Agent, or Firm—Adams Evans P.A.

(57) ABSTRACT

A coupling member 2 is brought into a mouth 23 to contact a camming surface 61 of an engagement member 60. The member 60 rotates clockwise to bring the securement means 50 up to retain the coupling member. A camming surface 62 of the engagement member 60 contacts surface 72 of a restrictor 70 to cause the restrictor to first move anticlockwise and then to drop back in a clockwise direction to trap the engagement member in position and to prevent the securement means 50 from allowing the coupling member 2 to be released.

23 Claims, 8 Drawing Sheets

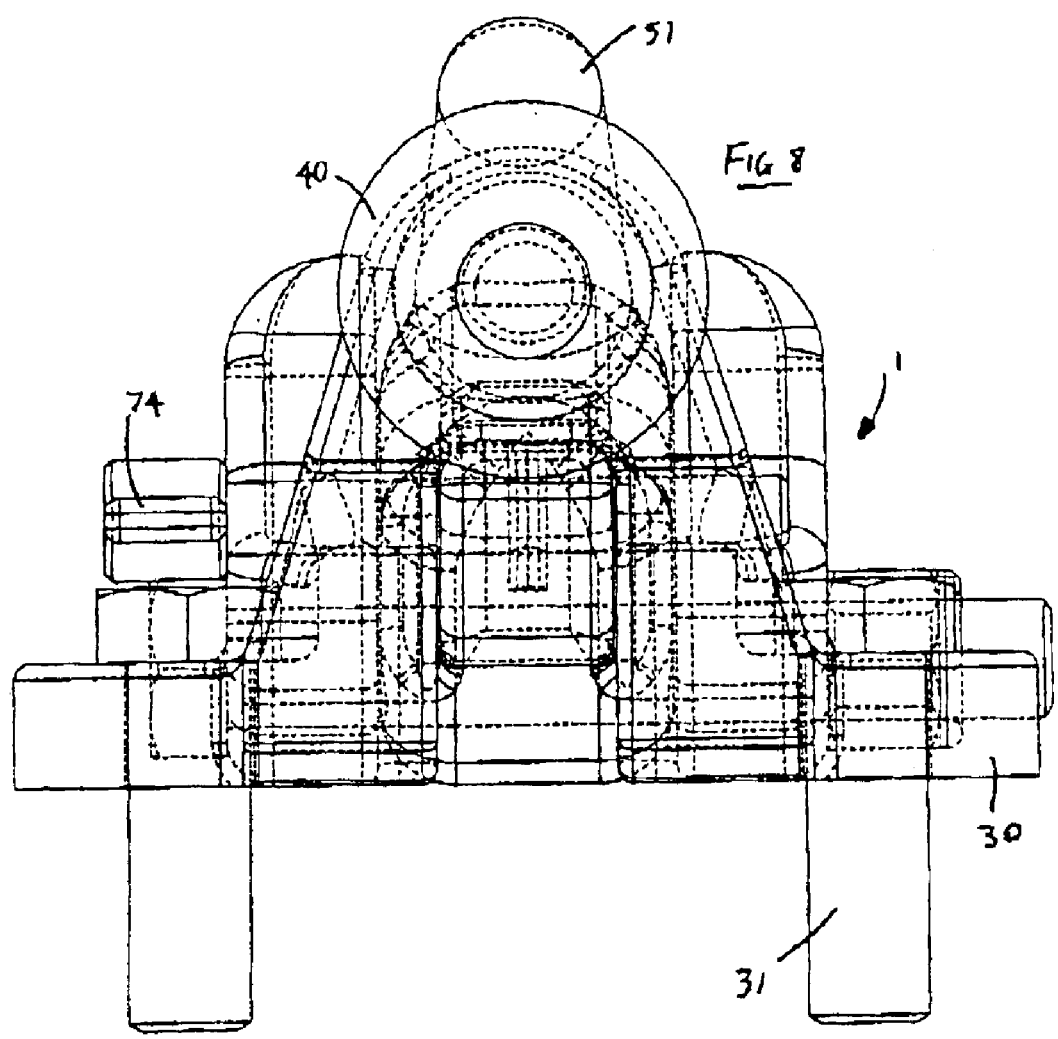

COUPLING DEVICE

The present invention relates to a coupling device and a method of coupling a trailer to a coupling device.

There are many different types of coupling devices for securing towing and towable vehicles to one another. Known devices are often inconvenient and potentially difficult or dangerous to operate since the towing vehicle and towable vehicle must generally be suitably positioned relative to one another before being secured together by an operator. Furthermore, often two operators are required, one to ensure that the coupling device remains receptive to a hook and the other to manoeuvre the hook into the coupling device.

It is an object of the present invention to provide a coupling device which addresses at least one of the above or other problems associated with known coupling devices.

According to one aspect of the present invention a coupling device is provided that is arranged to be secured to one of a trailer or a towing vehicle, the device including a body arranged to receive an attachment on the other of a trailer or towing vehicle, the device including a retaining member arranged to retain the attachment and an abutment arranged to prevent movement of the retaining member from an operative position in which the attachment is retained, the retaining member being caused to move from an inoperative position to the operative position upon relative movement of the coupling device and the attachment towards each other, the abutment also being caused to move to a position in which movement of the retaining member from the operative position is prevented upon relative movement of the coupling device and the attachment towards each other.

The device may include an operative member arranged to move relative to the body when an attachment is moved to a position in which it is retained, movement of the operative member also causing movement of the retaining member. The retaining member and the operative member may be fastened with each other and may be integrally formed. Either or both of the operative member and the retaining member may be pivotally moveable relative to the body, for example, by being pivotally mounted thereon.

The body may include at least one jaw arranged to receive an attachment.

Movement of the operative member may be arranged to cause movement of the abutment to the position in which movement of the retaining member from the operative position is prevented. The abutment may be arranged to be engaged by the operative member to prevent movement of the retaining member away from the operative position. The abutment may be arranged to rest against the body in a position in which it can be moved by the operative member. During movement of the abutment member by the operative member, the abutment may be arranged to move in a first direction and subsequently in a second direction to the position in which movement of the operative member from the operative position is prevented. The abutment member may be arranged to move from a first position, upon engagement by the operative member, away from the first position, and back to a second position. The first and second positions may be adjacent to each other and may be substantially the same.

The abutment may be pivotally mounted relative to the body. The abutment may include a first and a second portion which the operative member may be arranged to engage, the first portion, upon initial engagement with and movement by the operative member, being arranged to move about the pivot in a first direction with a part of the operative member moving nearer to the pivot axis of the operative member, that part then being arranged to move away from the pivot axis during continued movement of the operative member such that the abutment then moves in the opposite direction to allow the operative member to engage the second portion after movement of the operative member is complete. The operative member may be arranged to slide over the first portion of the abutment during relative movement. The second portion of the abutment may be arranged to abut the operative member, for instance by cooperating faces abutting each other.

The operative member may be arranged to be able to be held by the abutment in a position in which, with an attachment of a trailer retained in the coupling device, force from the attachment in a forward or rearward direction is transferred directly to the body or the retaining member.

The coupling device may include holding means arranged to hold the abutment either in a position in which the abutment is prevented from moving to a position in which the retaining member can move away from the operative position, or in a position in which the abutment is rendered inoperative, for instance by being moved clear of the path of movement of the operative member or any combination thereof. The holding means may comprise a member such as a rod which the abutment is arranged to contact such that the abutment is prevented from further movement.

The abutment may be arranged to be held in at least one of its positions under a force exerted by the weight of the abutment about its mounting.

The abutment may be arranged to be moved manually from a position in which movement of the retaining member from the operative position is prevented to a position in which such movement of the retaining member is permitted.

The present invention also includes a method of coupling a trailer to a towing vehicle with a coupling device comprising causing relative movement of an attachment on one of the trailer and towing vehicle and the coupling device on the other of the trailer or towing vehicle with that movement causing movement of a retainer of the device to a position in which the abutment is retained, that relative movement also causing an abutment of the device to move to a position in which the retainer is unable to release the attachment.

The abutment may be caused to move to that position by being engaged by a part constrained to move with the retainer engaging and moving the abutment.

The movement may comprise causing the abutment to move in two different directions as the retainer moves to retain the attachment.

The method may comprise one or both of the retainer and the abutment pivoting during coupling of the trailer. When both pivot they may pivot about substantially parallel axes.

The method may comprise retaining the abutment in a position in which it would not be caused to retain the attachment if the attachment were to be retained by the retainer when the attachment is being detached from the coupling device.

The present invention also includes a vehicle or trailer having a coupling device as herein referred to.

The present invention includes any combination of the herein referred to features.

The present invention will now be illustrated by way of example with reference to the following embodiments in which:

FIG. 8 is a plan view showing hidden detail of the coupling device.

Figure 1:
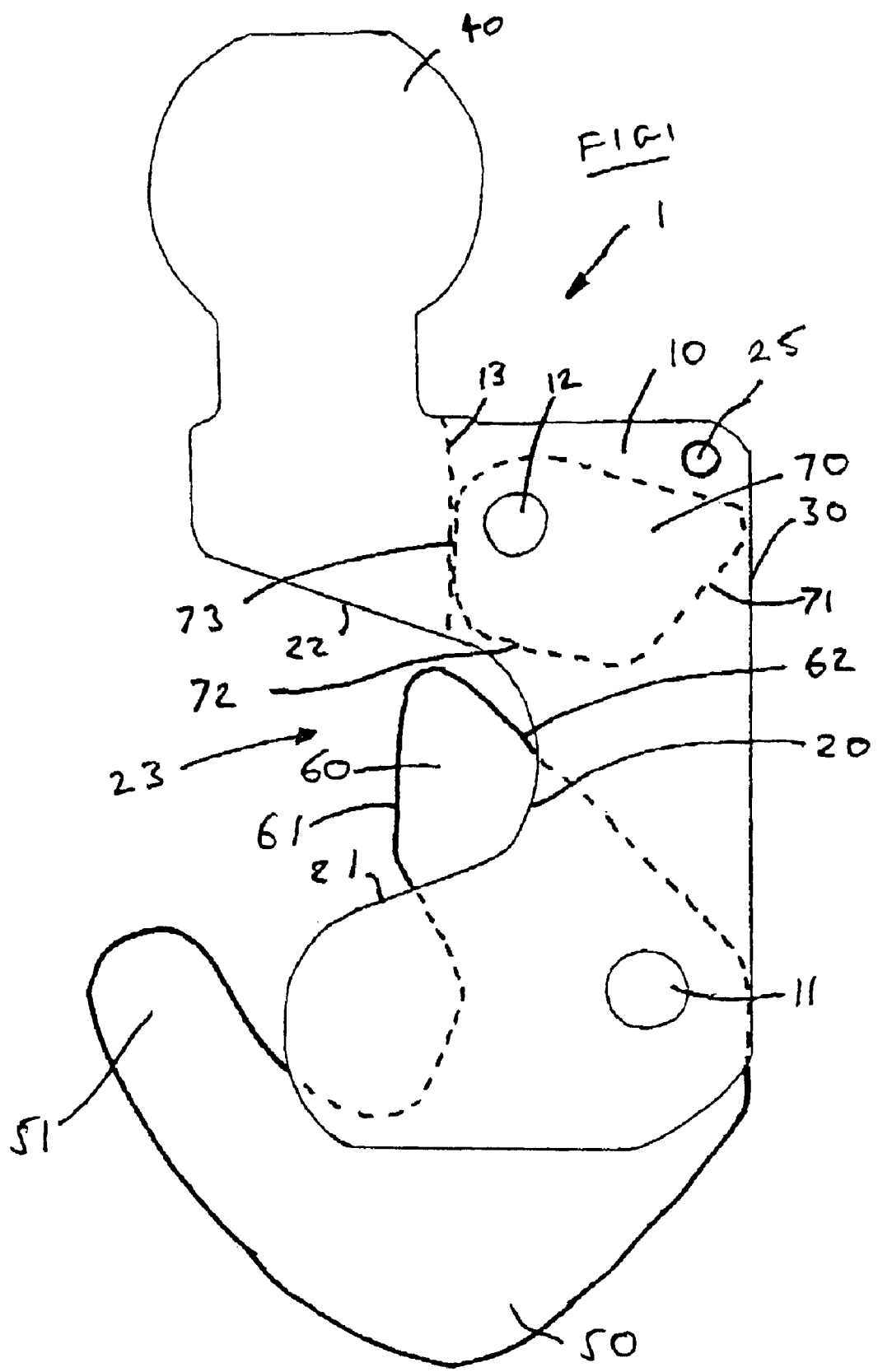
FIG. 1 is an elevational view showing hidden detail of a coupling device in a first, receiving configuration.
Figure 7:
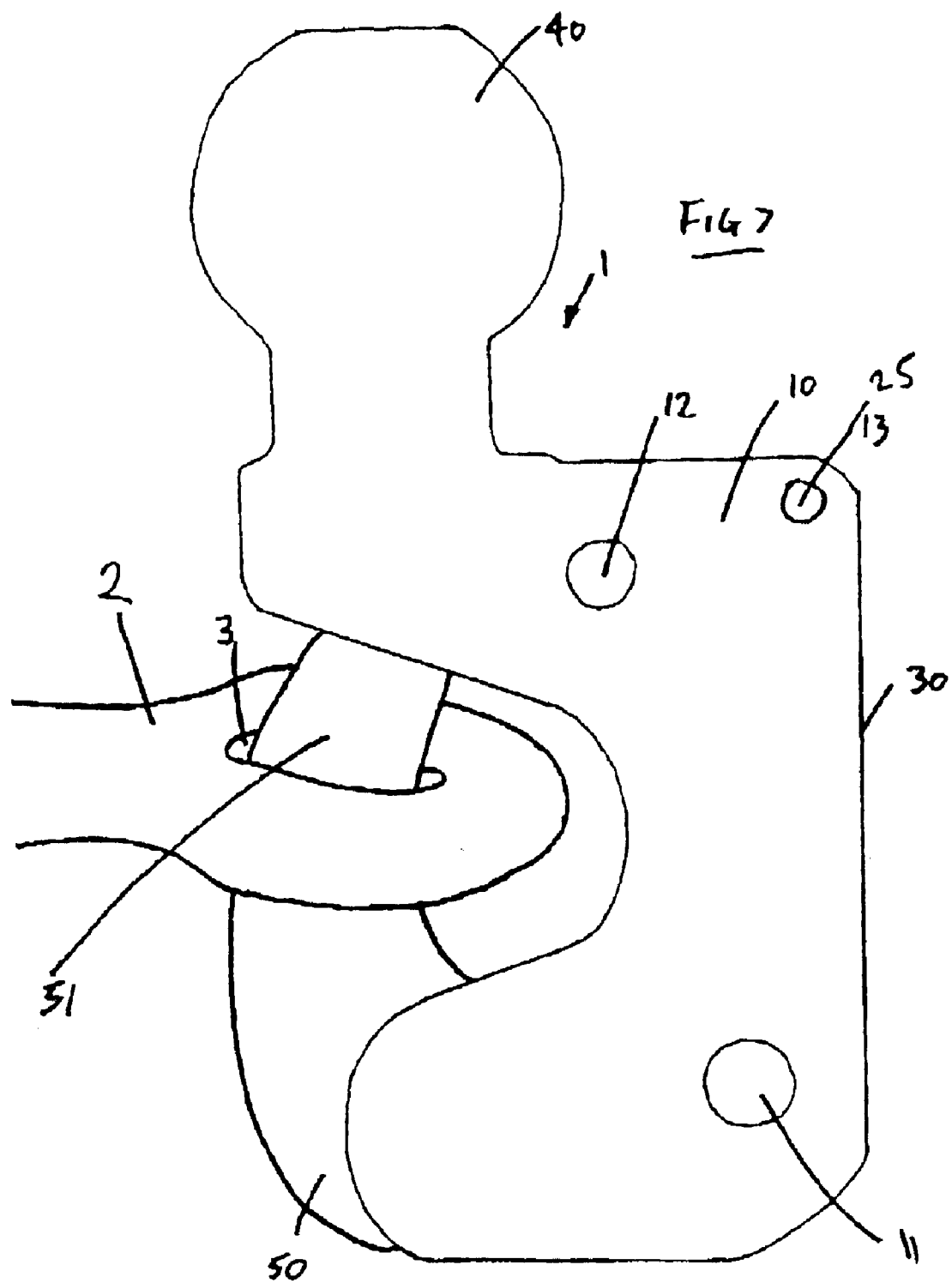
FIG. 7 is an elevational view of the coupling device in its second configuration when engaged with a coupling member.

As illustrated by FIG. 1 the coupling device 1 comprises a body 10 defining a jaw 20 having first and second surfaces 21, 22 which define a mouth 23 arranged to receive a coupling member 2 (illustrated in FIG. 7).

The coupling device 1 further comprises a back plate 30 (best illustrated by FIG. 6) by which it can be secured to the rear of a towing vehicle. Alternatively, the device 1 could be secured to a trailer. In addition the coupling device 1 may comprise a ball 40 of a conventional ball-coupling means. The back plate 30 and the ball 40 can both form integral elements of the body 10. Alternatively the ball 40 can be attached to the body 10, for instance by a screw thread, or omitted from the body.

The coupling device 1 further comprises a securement means 50 pivotably linked to the body 10 about pivot 11. The securement means 50 comprises a hook-shaped part 51, arranged such that it can retain the coupling member 2 in position relative to the coupling device 1. An engagement member 60 is integral with the securement means 50. The engagement member 60 comprises a first camming surface 61 and a second camming surface 62. The engagement member 60 is arranged such that it can cooperate with a coupling member 2 as it is inserted into the mouth 23 to cause the securement means 50 to move between a receiving and an engaged position.

Figure 2:
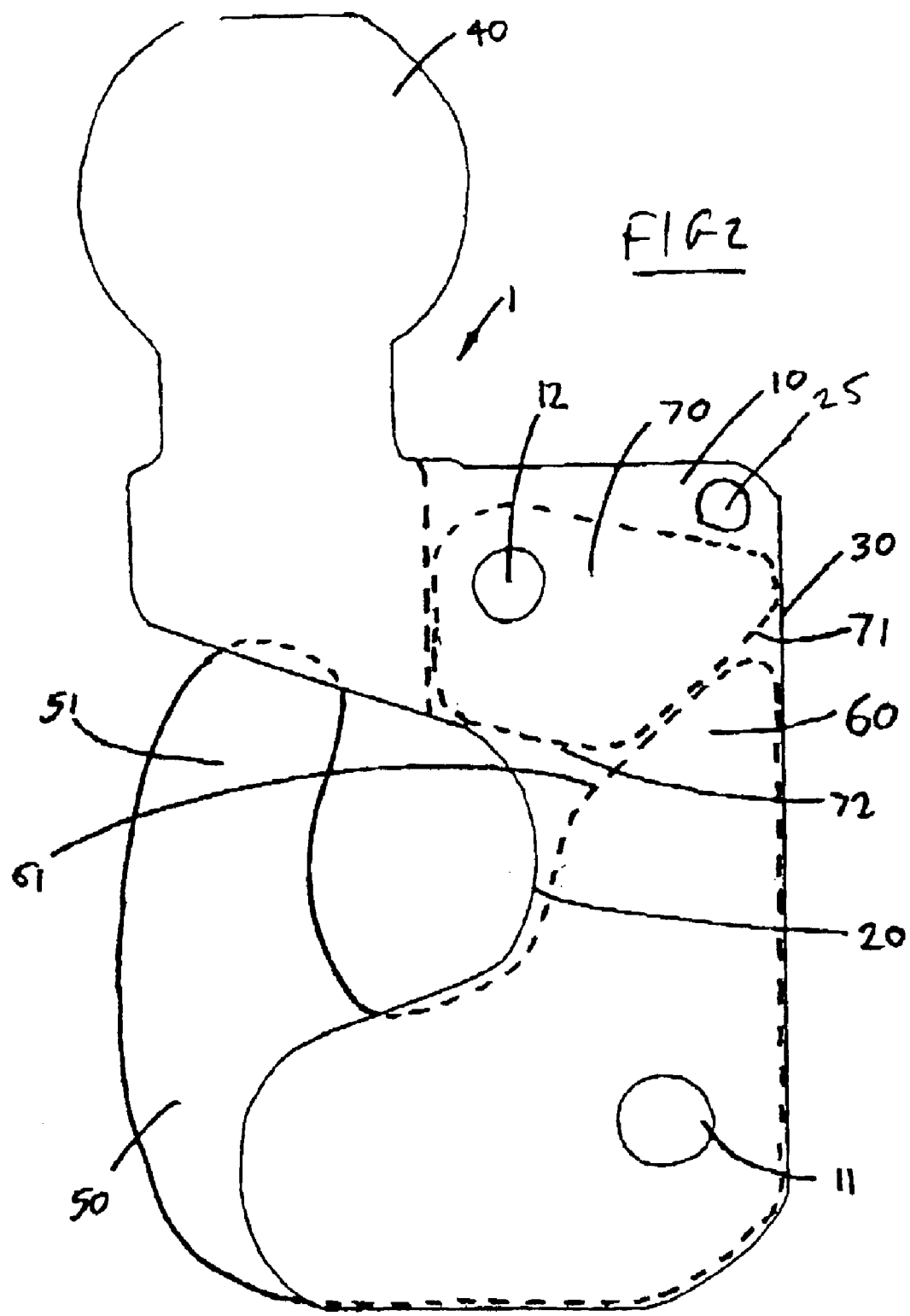
FIG. 2 is an elevational view showing hidden detail of the coupling device in a second engaged configuration.

The engagement member 60 is further arranged to cooperate with a restrictor member 70 to cause it to move to a position in which movement of the securement means 50 from the operative position is prevented, as shown in FIG. 2.

The restrictor member 70 is pivotably linked to the body 10 about pivot 12 and comprises an engagement face 71 which is arranged to abut the engagement member 60 when the coupling device is in its engaged configuration (best illustrated by FIG. 2) such that the restrictor member 70 prevents movement of the securement means 50 back to its inoperative position. The restrictor member 70 further comprises a contact surface 72 which is arranged to be contacted by the engagement member 60 as the securement means 50 moves towards its operative position. Additionally, the restrictor member 70 comprises an abutment surface 73 which is arranged to abut a stop 13 defined by the body 10 to define a position for the restrictor member 70 when the securement means 50 is in its inoperative position. Thus, the restrictor member 70 can not rotate any further in a clockwise direction (as shown in FIG. 1) about the pivot 12 than is shown by its position depicted in FIG. 1 as it is prevented by the stop 13.

Figure 5:
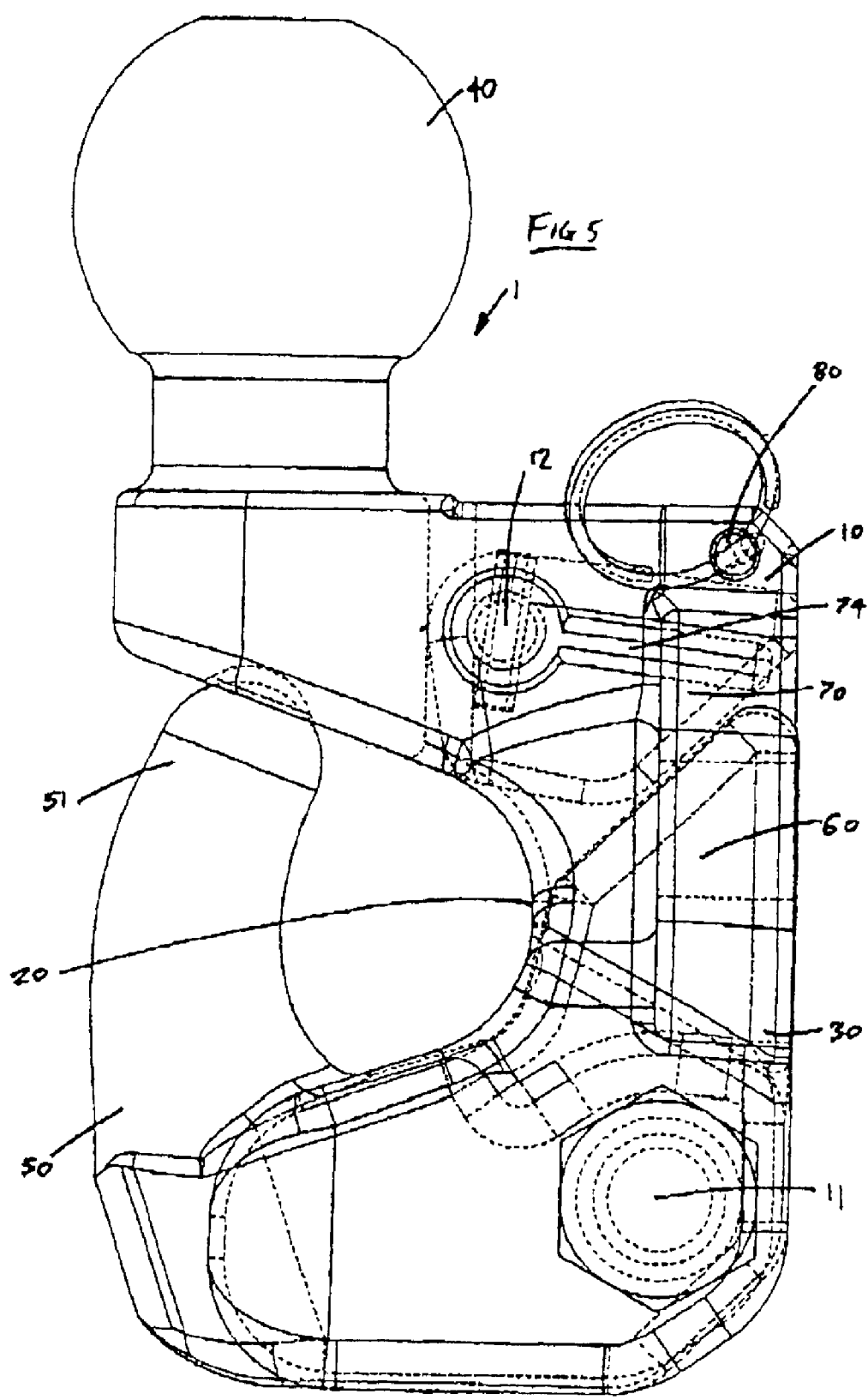
FIG. 5 is an elevational view showing hidden detail of the coupling device in its second configuration and also with a locking means employed.

The coupling device 1 further comprises coaxial apertures 25 in the body 10 thereof arranged to receive a pin 80 (shown in FIGS. 5 and 6) which can lock the restrictor member 70 in its operative position. This pin 80 and the locking effect are optional.

Figure 6:
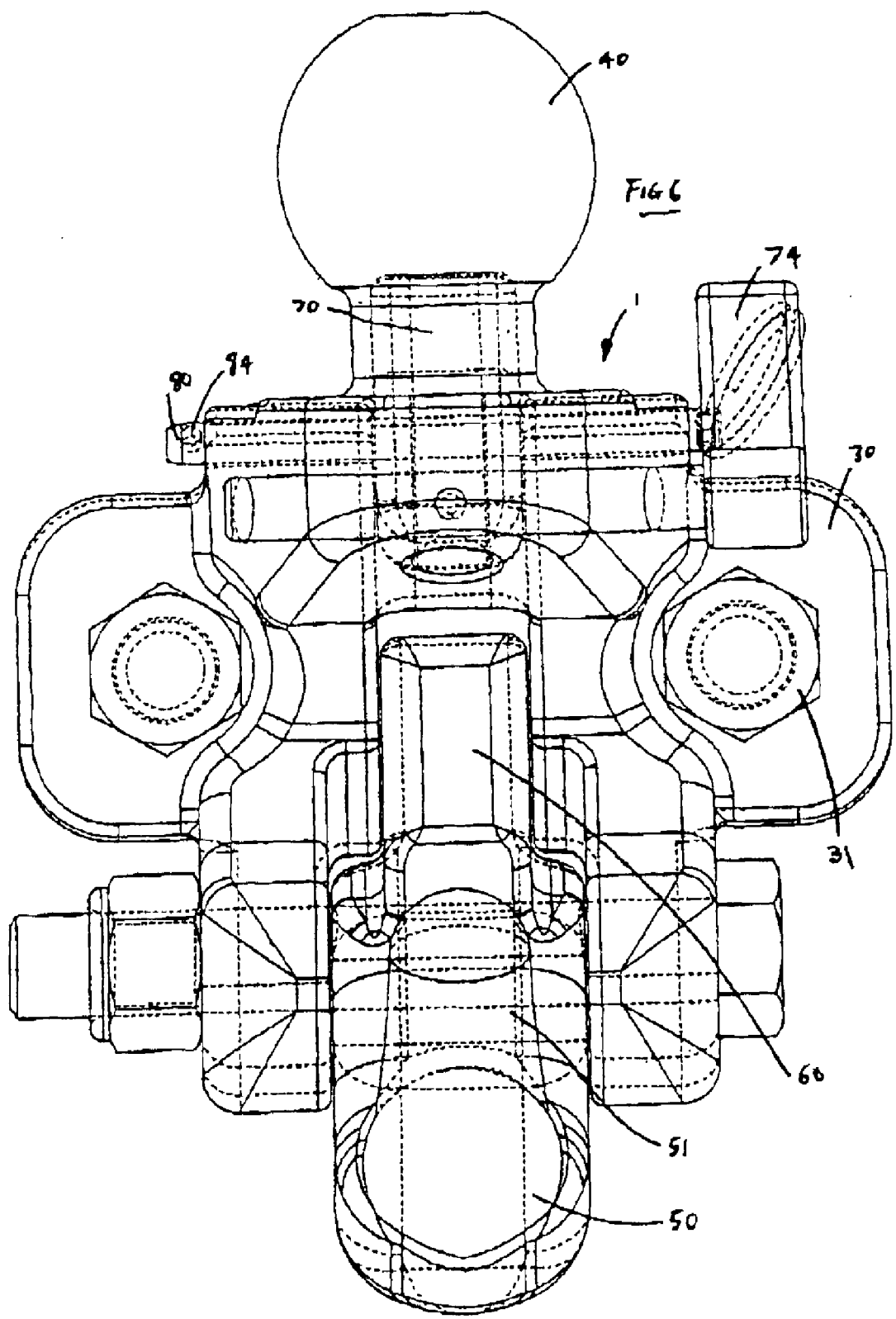
FIG. 6 is a front view showing hidden detail of the coupling device in its fourth configuration and also with a locking means employed.

In use, the coupling device 1 is secured to the rear of a towing vehicle by employing bolts 31 shown in FIG. 6 to attach the backplate 30 to the vehicle (not shown).

The coupling device 1 is then set in the receiving configuration shown in FIG. 1 in which the securement means 50 is in an inoperative position and the engagement member 60 contacts the second camming surface 72.

The coupling member 2 (not shown in FIG. 1) is then brought into the mouth 23 defined by the jaw 20 such that it contacts the first camming surface 61 of the engagement member 60. Further movement of the coupling member 2, towards the backplate 30 of the coupling device 1 causes the engagement member 60 and consequently the securement means 50 which is integral therewith to rotate (clockwise as viewed in FIG. 1) about the pivot 11. The second camming surface 62 of the engagement member 60 is also caused to abut the contact surface 72 of the restrictor member 70 and this simultaneously causes the restrictor member 70 to rotate (anti-clockwise as viewed in FIG. 1) about the pivot 12.

Continued movement of the coupling member 2 towards the backplate 30 causes the engagement member 60 and consequently the securement means 50 to rotate further until the securement means 50 reaches its operative position (best shown by FIGS. 2 and 7). Just before the securement means 50 reaches the position shown in FIG. 2, the restrictor member 70 drops down in a clockwise direction to the position shown in FIG. 2 in which the first camming surface 61 of the engagement member 60 and engagement surface 71 of the restrictor member 70 contact one another. When the securement means 50 is in its operative position the hook-shaped part 51 passes through the eye 3 of the coupling member 2 to retain the coupling member 2 in position relative thereto.

The engagement member 60 may be able to move beyond the rear of the jaw, and possibly held in that position by the restrictor member 70, such that, if the vehicle towing the trailer brakes, the force from the coupling member is transferred through the jaws.

As the securement means 50 is moved into its operative position the engagement member 60 moves to its engaged position and the restrictor member 70 moves to its operative position. When the engagement member 60 is in its engaged position and the restrictor member 70 is in its operative position (best illustrated by FIG. 2) the first camming surface 61 of the engagement member abuts the engagement surface 71 of the restrictor member 70. The engagement surface 71 lies over centre relative to the pivot 12 about which the restrictor member 70 is mounted. Thus, any force applied to the engagement surface 71 by the engagement member 60 is directed towards the pivot 12 and consequently does not permit rotation of the restrictor member 70. The restrictor member 70 can thus prevent movement of the engagement member 60 back and thus retains the coupling member 2.

The pin 80 may be inserted through apertures 25 to prevent further rotation of the restrictor member 70 (anti-clockwise as shown in FIG. 2) to ensure that the restrictor member 70 can not be accidentally moved into a release position in which it allows movement of the engagement member 60 and consequently release of the coupling member 2.

Figure 3:
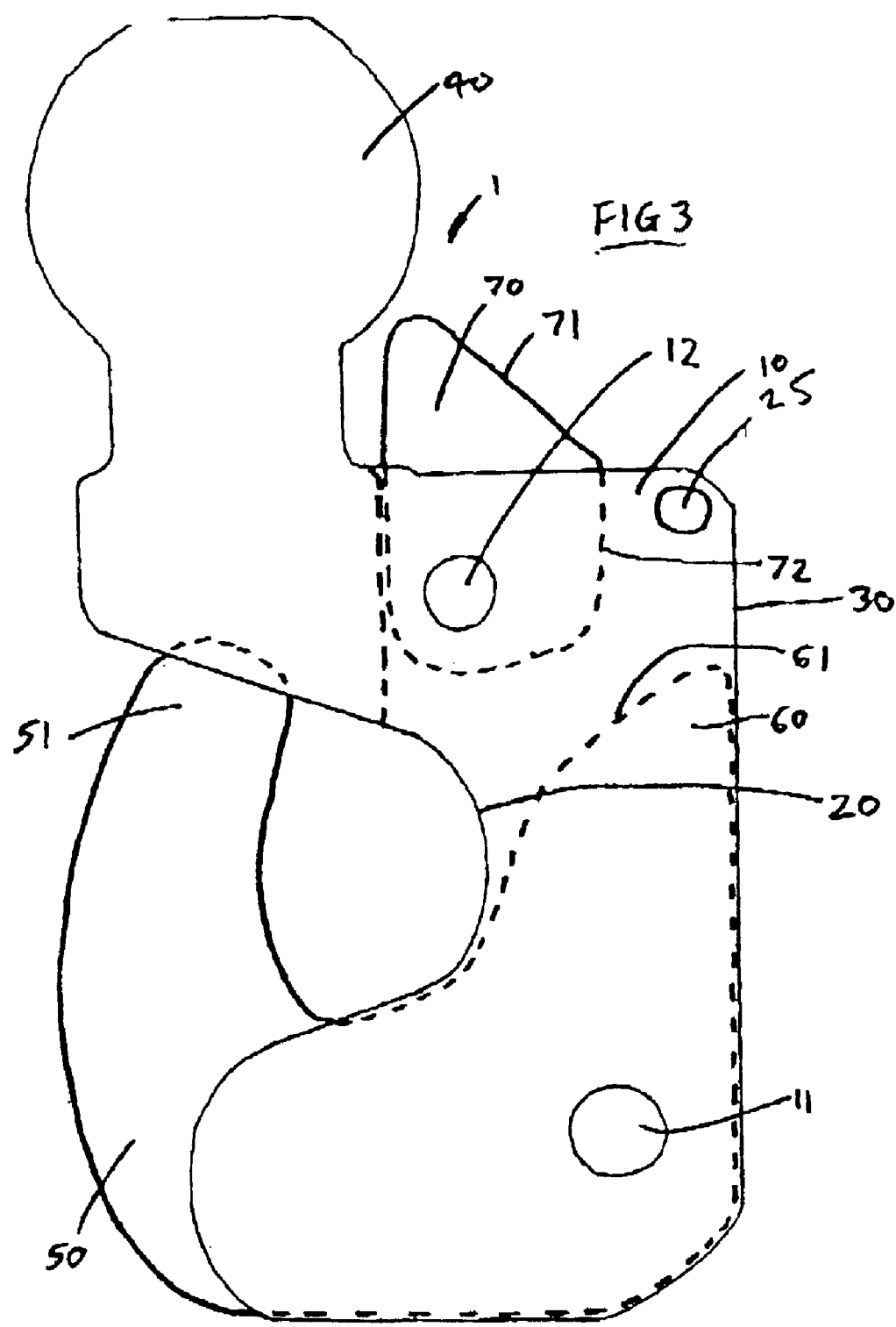
FIG. 3 is an elevational view showing hidden detail of the coupling device in a third configuration.
Figure 4:
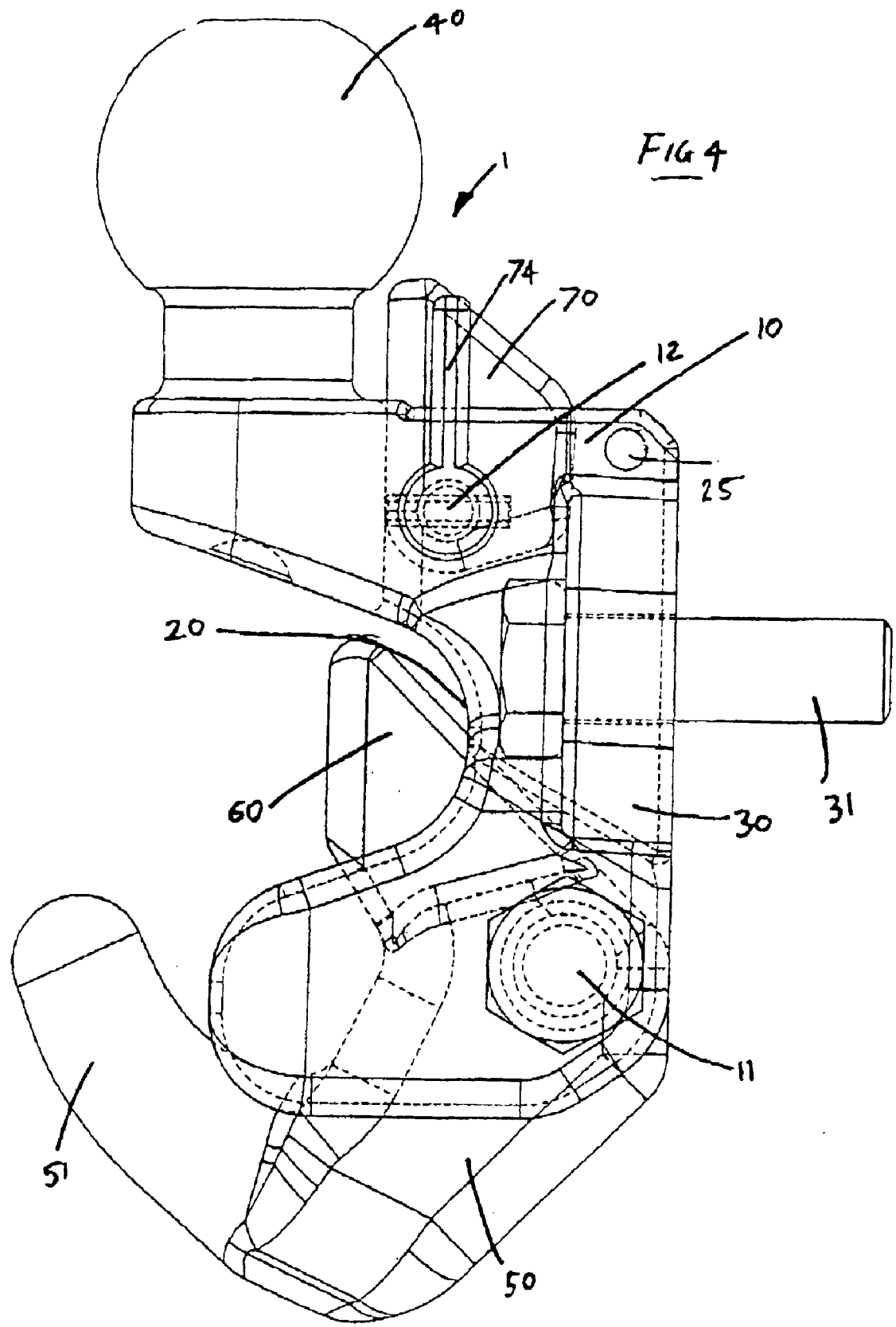
FIG. 4 is an elevational view showing hidden detail of the coupling device in a fourth configuration.

When it is desired to bring the coupling member 2 and coupling device 1 out of engagement with one another the pin 80 can be removed from the body 10 such that it does not block the path of the restrictor member 70. The restrictor member 70 can then be caused to move to a release position (best illustrated by FIG. 3) by a user turning actuating means 74 (best illustrated by FIG. 6) such that the restrictor member 70 is caused to rotate (anti-clockwise as shown in FIG. 2). In its release position the engagement surface 71 of the restrictor member 70 is brought out of contact with the engagement member 60. The engagement member 60 is then free to rotate (anti-clockwise as shown in FIG. 3) back towards its contact position and the securement member 50 is consequently free to rotate (anti-clockwise as shown in FIG. 3) back towards its inoperative position. The pin 80 can be reinserted through its openings 25 to prevent inadvertent dropping of the restrictor member from the position shown in FIGS. 3 and 4. Thus a single operator can attach and detach the engagement member 2 with both handles free to effect each operation.

With the restrictor member 70 in its release position applying a force to the engagement member 2 (not shown in FIG. 3) causes the securement means 50 to rotate towards its inoperative position and the engagement means 60 to its contact position. With the coupling device and coupling member separated the securement means 50 and engagement member 60 are in their operative and contact position respectively, i.e. their starting configuration (best illustrated by FIG. 4). The restrictor member 70 remains in its release position until allowed to return to its inoperative position by the operator. Once the operator does this the coupling device is then in its starting configuration (best illustrated by FIG. 1) ready for the process to be repeated.

The pin 80 can be held in the position shown by two spring biased balls 84 extending outwardly from the end of the pin 80 which abuts against the outside of openings 30. That bias can be overcome to squeeze the balls back in when the pin is pulled out. Alternatively, a clip can cooperate with a groove in that end of the pin 80 to provide a lock that must be removed before the pin 80 can be removed. Alternatively, the pin 80 can include a spigot rotatable on its free end that prevents withdrawal of the pin 80 but which can be rotated to be axially aligned with the pin 80 to allow withdrawal. The pin 80 can be axially biased to urge the spigot into engagement with the body by a spring mounted around the end of the pin 80 remote from the spigot.

The coupling device of the present invention may thus provide an improved means of securing a towable vehicle to a towing vehicle which is both convenient and safe to use. The coupling device may also be simple in construction and thus allow for economical manufacture.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any, method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A coupling device in which the coupling device is arranged to be secured to one of a trailer or a towing vehicle, the coupling device including a body arranged to receive an attachment member on the other of a trailer or towing vehicle, the device including a retainer arranged to retain the attachment member and the device also including an abutment arranged, when in a first position relative to the retainer, to allow movement of the retainer into an operative position, and when in a second position relative to the retainer to prevent movement of the retainer from its operative position in which, in use, the attachment member is retained by the retainer;

the coupling device arranged such that when the trailer and towing vehicle are coupled, the retainer is caused to move from an inoperative position to the operative position upon relative movement of the coupling device and the attachment member towards each other, the abutment also being caused to move to the second position in which movement of the retainer from the operative position is prevented upon relative movement of the coupling device and the attachment member towards each other, wherein the abutment is arranged to move to both of its positions under a force exerted by the weight of the abutment about its mounting without the use of a spring.

2. A device as claimed in claim 1 in which the device includes an operative member arranged to move relative to the body when the attachment member is moved to a position in which it is retained, movement of the operative member also causing movement of the retainer.

3. A device as claimed in claim 1 in which at least one of an operative member, the retainer or the abutment is pivotally movable relative to the body.

4. A device as claimed in claim 3 in which the pivotal movement is achieved by pivotally mounting the operative member, the abutment or the retainer on the body.

5. A device as claimed in claim 2 in which movement of the operative member is arranged to cause movement of the abutment to the position in which movement of the retainer from the operative position is prevented.

6. A device as claimed in claim 5 in which the abutment is arranged to engage the operative member to prevent movement of the retainer away from the operative position.

7. A device as claimed in claim 6 in which the abutment is arranged to rest against the body in a position in which it can be moved by the operative member, prior to the device being connected to the attachment member.

8. A device as claimed in claim 5 in which, during movement of the abutment member by the operative member, the abutment is arranged to move in a first direction and subsequently in a second direction to the position in which movement of the operative member from the operative position is prevented.

9. A device as claimed in claim 1 in which the abutment includes a first and a second portion which the operative member is arranged to engage, the first portion, upon initial engagement with and movement by the operative member being arranged to move about a pivot in the first direction with a part of the operative member moving nearer to the pivot axis of the abutment member, that part then being arranged to move away from the pivot axis during continued movement of the operative member such that the abutment member then moves in the opposite direction to allow the operative member to engage the second portion, after movement of the operative member is complete.

10. A device as claimed in claim 9 in which the operative member is arranged to slide over the first portion of the abutment during relative movement.

11. A device as claimed in claim 9 in which the second portion of the abutment is arranged to abut the operative member.

12. A device as claimed in claim 11 in which the second portion of the abutment abuts the operative member by co-operating faces abutting each other.

13. A device as claimed in claim 1 in which the operative member is arranged to be able to be held by the abutment in a position in which, with the attachment member retained in the coupling device, force transferred between a trailer and a towing vehicle in a forwards and rearwards direction is transferred directly to the body or the retainer.

14. A device as claimed in claim 1 including holding means arranged to hold the abutment in a position in which the abutment is rendered inoperative.

15. A device as claimed in claim 14 in which the holding means comprise a member which the abutment is arranged to contact such that the abutment is prevented from further movement.

16. A device as claimed in claim 1 in which the abutment is arranged to be moved manually from a position in which movement of the retainer from the operative position is prevented to a position in which such movement of the retainer is permitted.

17. A method of coupling a trailer to a towing vehicle with a coupling device comprising causing relative movement of an attachment member on one of the trailer or towing vehicle and a coupling device on the other of the trailer or towing vehicle with that movement causing movement of a retainer of the device to a position in which the attachment member is retained, that relative movement also causing an abutment of the device to move from an inoperative position in which the retainer can move to an operative position in which the retainer is unable to release the attachment member, with the movement of the abutment occurring under a force exerted by gravity without the use of a spring.

18. A method as claimed in claim 17 in which the abutment is caused to move to that position by being engaged by a part constricted to move with the retainer engaging and moving the abutment.

19. A method as claimed in claim 17 in which the movement of the abutment to a position in which the retainer is unable to release the attachment member causes the abutment to move in two different directions as the retainer moves to retain the attachment member.

20. A method as claimed in any of claim 17 comprising at least one of the retainer or the abutment pivoting during coupling of the trailer and the towing vehicle.

21. A method as claimed in claim 20 in which when both the retainer and the abutment pivot during coupling of the trailer and the towing vehicle, the retainer and the abutment pivot about substantially parallel axes.

22. A method as claimed in claim 17 comprising locating the abutment in a position in which it would not be caused to retain the attachment member if the attachment member were to be retained by the retainer when the attachment member is being detached from the coupling device.

23. A method as claimed in claim 22 comprising the locating and retaining the abutment in a position in which it would not be caused to retain the attachment member if the attachment member were to be retained by the retainer when the attachment member is being detached from the coupling device.

* * * * *

UNITED STATES PATENT AND TRADEMARK OFFICE
CERTIFICATE OF CORRECTION

PATENT NO. : 6,851,698 B2 Page 1 of 1
DATED : February 8, 2005
INVENTOR(S) : David Ingles It is certified that error appears in the above-identified patent and that said Letters Patent is hereby corrected as shown below:

<u>Column 8,</u>
Line 9, delete "constricted" and enter -- constrained --.

Signed and Sealed this

Third Day of May, 2005

JON W. DUDAS
*Director of the United States Patent and Trademark Office*